(12) United States Patent
Fallais et al.

(10) Patent No.: US 7,553,520 B2
(45) Date of Patent: Jun. 30, 2009

(54) PROCESS FOR APPLYING A COATING TO A COILED METAL SHEET

(75) Inventors: Isabelle Fallais, Tangissart (BE); Thierry Randoux, Braine L'Alleud (BE); Marc Heylen, Leuven (BE); Rami Awad, Graz (AT); Kris Verschueren, Dilbeek (BE)

(73) Assignee: Cytec Surface Specialties, S.A., Brussels (BE)

( * ) Notice: Subject to any disclaimer, the term of this patent is extended or adjusted under 35 U.S.C. 154(b) by 0 days.

(21) Appl. No.: 11/907,377

(22) Filed: Oct. 11, 2007

(65) Prior Publication Data

US 2008/0095949 A1    Apr. 24, 2008

Related U.S. Application Data

(62) Division of application No. 10/578,358, filed as application No. PCT/EP2004/014020 on Dec. 9, 2004.

(30) Foreign Application Priority Data

Dec. 16, 2003    (EP) .................................. 03028847

(51) Int. Cl.
*B05D 7/16* (2006.01)
*C08F 2/48* (2006.01)

(52) U.S. Cl. ..................... 427/388.1; 427/508; 427/553

(58) Field of Classification Search ....................... None
See application file for complete search history.

(56) References Cited

U.S. PATENT DOCUMENTS

| 3,652,520 | A | 3/1972 | Ryan et al. | |
| 2002/0132059 | A1* | 9/2002 | Maddox et al. | ............. 427/487 |
| 2003/0018150 | A1 | 1/2003 | Hong et al. | |

FOREIGN PATENT DOCUMENTS

| EP | 0 261 890 A2 * | 9/1987 |
| EP | 0 261 890 A2 | 3/1988 |
| EP | 0 533 459 A1 | 3/1993 |
| GB | 2 119 810 | 11/1983 |

* cited by examiner

*Primary Examiner*—William Phillip Fletcher, III
(74) *Attorney, Agent, or Firm*—Wenderoth, Lind & Ponack, L.L.P.

(57) ABSTRACT

The invention relates to a process for preparing a coated metal sheet coil comprising the coating of the metal sheet with a curable composition comprising an (meth)acrylated oligomer which is the reaction product of a carboxyl functionalized polybutadiene comprising x equivalents of —COOH groups with (i) y equivalents of one or more (meth)acrylated monoepoxides or (ii) a mixture of z equivalents of one or more polyepoxides and at least (z–x) equivalents of an α,β-unsaturated carboxylic acid; with z>x and y≧x.

10 Claims, No Drawings

PROCESS FOR APPLYING A COATING TO A COILED METAL SHEET

This is a divisional of Ser. No. 10/578,358, filed May 31, 2006, which a 371 of PCT/EP2004/014020, filed Dec. 9, 2004.

BACKGROUND OF INVENTION

(1) Field of Invention

The invention relates to a process for applying a coating comprising a polymerizable composition to a metal strip that will be further coiled and destined to be post-formed.

Coil coaters coat metal coils of various types and forms. These metals are selected for various end uses depending on their specific characteristics. There is a broad diversity of applications such as container products including beer and beverage cans, building materials such as ducts, roofing, rain gutters, furniture, transportation applications like automotive trim and travel trailers. In the case of some metals such as steel, a zinc protective layer against corrosion can be applied previous to the coil coating process. It is usually done on a galvanization or electrozinc line. The bare metal coil is unwound and both top and bottom sides are cleaned to remove dirt, oil, grease, surface rust and prepare a chemically clean surface. The zinc layer can be deposited by dipping the strip in a zinc bath (galvanization process) or by electrodeposition (electrozinc process). The strip is then oiled before being recoiled in order to protect the metal surface against corrosion during transportation and storage before coating. Coil coating most often takes place on another line. It is a continuous and highly automated process for coating metal at high speed before fabrication. The process usually consists of the following steps. The metal coil is unwound again and both the top and bottom sides are mechanically and chemically cleaned to remove oil, grease and dirt. After cleaning, a chemical pretreatment can be applied to the sheet in order to enhance the corrosion protection and the paint adhesion. The strip then moves directly into a drying oven before entering the coating unit. After the paint has been applied, the strip moves again into a drying oven before being cooled and rewound for shipment.

The precoated sheets are used in the metal-processing industry. So, many metal articles are not coated or painted as used or when assembled, but are first coated as flat stock provided in coils and then formed, cut and assembled into the desired articles. As a consequence, a key criterion in almost all cases is the ability to post form or bend the coated strip. Post forming is usually done by high speed processing equipment wherein the metal bending can be very severe. The coating must be flexible to allow the post forming or bending to occur without cracking and yet maintain adhesion. The full system what means the metal, in some cases the protective zinc layer, the pretreatment layer and the paint layer has also to reach a high level of corrosion resistance. Basic properties like chemical and stain resistance remain important and for some applications, properties like humidity and sterilization tests resistance are also required. Radiation curable systems could be a good fit for coil coating; the substrate is flat, the line speed is high, it can solve environmental issues like the use of solvents and it requires less energy and floor space than the curing ovens necessary with other coating technologies. However until now, radiation curable coating compositions, especially UV formulations have not been widely used for coil coating applications. Typical UV formulations consist of (meth)acrylated oligomers and reactive diluents, which when cured, form a highly crosslinked coating layer having good properties such as chemical resistance, scratch resistance and surface hardness. Such high crosslink density is also associated with a limited flexibility and shrinkage of the film limiting adhesion on the metal substrate. When trying to find solutions to these stringent requirements, one is often limited between lowering the molecular weight to achieve a reasonable viscosity and the need for a substantive molecular weight between crosslinks in order to reach the required cured coating flexibility.

(2) Description of Related Art

For coil coating applications where a high level of flexibility is essential for post forming operations, such typical UV formulations are not suitable. US 2002/0132059 A1 describes the principle of using a photopolymerizable coating composition for the coating of a coiled metal sheet. In the method for applying a coating to coiled metal sheet therein described, the metal sheet is first cleaned and then pretreated before applying the coating composition. No specific photopolymerizable compositions are disclosed in this patent application and almost any composition comprising a difunctional unsaturated oligomer, a monofunctional unsaturated acrylic monomer, a difunctional unsaturated monomer and a photoinitiator seems to satisfy the requirements. Example 1 of this patent application refers to a difunctional unsaturated oligomer having a polybutadiene backbone. U.S. Pat. No. 3,652,520 discloses such oligomers and more specifically acrylated polybutadiene resins obtained from the reaction of hydroxyl terminated polybutadiene and (meth)acrylic acid or derivatives thereof such as acryloyl chloride, methylmethacrylate and methylcrotonate. These oligomers do not permit to obtain good results in coil coating applications. Hence not all photopolymerizable coating compositions comprising difunctional unsaturated oligomer, a monofunctional unsaturated acrylic monomer, a difunctional unsaturated monomer and a photoinitiator permit to obtain satisfying results when used in coil coating processes. US 2003/00018150 describes a radiation curable composition comprising a blend of a polybutadiene oligomer, an acrylated bisphenol-A derivative and a reactive compatible compound and its use for coil coating application. These blends are obtained by mixing the different ingredients. These blends are not storage stable and demix quite rapidly.

Hence, the known compositions do not permit to obtain satisfactory results when used for coil coating applications.

BRIEF SUMMARY OF THE INVENTION

The present invention provides a process that overcomes the above-mentioned problems. The present invention therefore relates to a process for preparing a coated metal sheet coil comprising the following steps:

(1) decoiling of the coiled metal sheet;

(2) coating the metal sheet with a curable composition comprising an (meth)acrylated oligomer which is the reaction product of a carboxyl functionalized polybutadiene comprising x equivalents of —COOH groups with (i) y equivalents of one or more (meth)acrylated monoepoxides or (ii) a mixture of z equivalents of one or more polyepoxides and at least (z−x) equivalents of an α,β-unsaturated carboxylic acid with z>x and y≧x;

(3) curing the composition; and (4) recoiling the coated metal sheet.

DETAILED DESCRIPTION OF THE INVENTION

In the present invention, curable composition refers to a composition comprising at least one compound having ethylenically unsaturated groups that can be polymerised, i.e. cured, for example by thermal curing or irradiation.

The metal sheet is generally chosen from cold rolled steel (with or without pre-treatment), hot rolled steel (with or without pre-treatment), stainless steel, Zn-treated steel (with or without pre-treatment), such as electro-zinced and hot dip galvanized steel, Al (with or without pre-treatment) and hot dip tin.

In the process according to the invention, the decoiling and recoiling of the metal sheet can be done by any means suitable therefore. In the process according to the invention the decoiled metal sheet can be submitted to any suitable treatment before coating it with the curable composition. The decoiled metal sheet is usually cleaned in order to remove the protection oil layer. After cleaning, a chemical pretreatment can also applied to the sheet in order to enhance the corrosion protection and the coating adhesion.

In the process according to the invention, the curable composition can be applied to the metal sheet by any means suitable therefore such as dip coating, spray coating, electrostatic coating, film coating, curtain coating, vacuum application, roll coating or the like. It is preferably applied by roll coating. The application of the curable composition to the metal sheet can be done at any suitable temperature, such as room temperature or at a higher temperature, for example by heating the metal sheet, the roller coater and/or the curable composition.

The curable composition used in the present invention comprises an (meth)acrylated oligomer obtained from a carboxyl functionalized polybutadiene. By carboxyl functionalised polybutadiene is meant to designate a polybutadiene comprising free —COOH (carboxyl) groups. Carboxyl functionalized polybutadienes are known, they have for example been described in U.S. Pat. No. 3,705,208 and are commercially available under the trade name of Nisso PB C-1000 (Nippon Soda Co). Carboxyl functionalized polybutadienes can also be obtained by the reaction of a hydroxyl functionalized polybutadiene (that is a polybutadiene having free —OH, hydroxyl, groups) with a cyclic anhydride such as for example has been described in EP 845008, EP 261890 and EP 533459.

Carboxyl and hydroxyl functionalized polybutadienes suitable for being used in the process according to the present invention contain besides the carboxyl and/or hydroxyl groups, units derived from the polymerization of butadiene. The polybutadiene (PDB) generally comprises 1-4 cis units/1-4 trans units/1-2 units in a ratio a/b/c where a, b and c range from 0 to 1 with a+b+c=1.

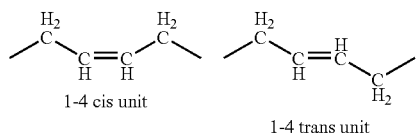

1-4 cis unit 1-4 trans unit

-continued

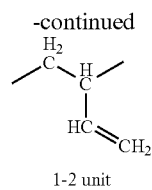

1-2 unit

The number average molecular weight (Mn) of the carboxyl functionalized polybutadiene is preferably from 200 to 50000 Da. The Mn is more preferably at least 1000. The Mn more preferably does not exceed 5000 Da.

Examplary hydroxyl and carboxyl polybutadienes include without limitation Poly BD R-20LM (hydroxyl functionalized PDB, a=0.2, b=0.6, c=0.2, Mn 1230) and Poly BD R45-HT (hydroxyl functionalized PDB, a=0.2, b=0.6, c=0.2, Mn 2800) commercialized by Atofina, Nisso-PB G-1000 (hydroxyl functionalized PDB, a=0, b<0.15, c>0.85, Mn 1250-1650), Nisso-PB G-2000 (hydroxyl functionalized PDB, a=0, b<0.15, c>0.85, Mn 1800-2200), Nisso-PB G-3000 (hydroxyl functionalized PDB, a=0, b<0.10, c>0.90, Mn 2600-3200), Nisso-PB C-1000 (carboxyl functionalized PDB, a=0, b<0.15, c>0.85, Mn 1200-1550) obtainable from Nippon Soda Co.

When carboxyl functionalized polybutadienes obtained from the reaction of a hydroxyl functionalized polybutadiene with a cyclic anhydride are used, this cyclic anhydride preferably responds to the general formula (I)

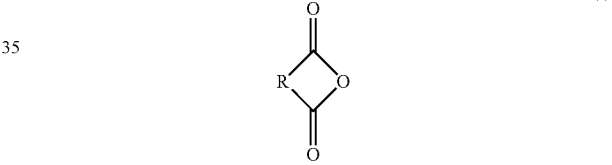

(I)

wherein R represents arylene, cycloalkylene, alkylene or alkenylene group, it being possible for R to bear alkyl, alkenyl groups, a —COOH group and/or another anhydride group. Exemplary anhydrides include phthalic anhydride, hexahydrophthalic anhydride, glutaric anhydride, succinic anhydride, dodecenylsuccinic anhydride, maleic anhydride, trimellitic anhydride, pyromellitic anhydride. Preferred anhydrides are those wherein R is an arylene (more preferably phenylene) or an alkylene (more preferably ethylene) substituted by an alkenyl chain comprising from 5 to 20 carbon atoms. Preferred anhydrides are phthalic anhydride and dodecenylsuccinic anhydride. Mixtures of anhydrides can also be used.

The amount of anhydride used for the preparation of a carboxyl functionalized polybutadiene from a hydroxyl functionalized polybutadiene is generally at least 0.8 p, preferably at least 0.9 p and more preferably at least 0.95 p equivalent per p equivalents of —OH groups present in the polybutadiene. The amount of anhydride used is usually at most 1.2 p equivalent, preferably at most 1.1 p and more preferably at most 1.0 p equivalents, with respect to the p —OH equivalents of the polybutadiene.

The —COOH functionality (COOH groups per molecule) of the carboxyl functionalized polybutadiene used in the present invention is generally from 1.5 to 9, preferably from 1.8 to 6.

According to a first variant of the invention, the curable composition used in the process according to the invention comprises an (meth)acrylated oligomer which is the reaction product of a carboxyl functionalized polybutadiene comprising x equivalents of —COOH groups with y equivalents of one or more (meth)acrylated mono-epoxides, y being equal to or greater than x. Preferably y=x. When y is greater than x, it is preferred to add to the reaction mixture of the carboxyl functionalized polybutadiene also at least one α,β-unsaturated carboxylic acid, preferably in an amount of at least (y−x), more preferably of (y−x).

(Meth)acrylated mono-epoxides are known. Examples of (meth)acrylated mono-epoxides that can be used are glycidyl (meth)acrylate esters, such as glycidylacrylate, glycidylmethacrylate, 4-hydroxybutylacrylate glycidylether, bisphenol-A diglycidylether monoacrylate. The (meth)acrylated mono-epoxides are preferably chosen from glycidylacrylate and glycidylmethacrylate.

According to an embodiment of this first variant of the invention, the carboxyl functional polybutadiene used in this variant is itself the condensation product of a carboxyl functional polybutadiene comprising q equivalents of —COOH groups with less than q equivalents epoxide groups of one or more polyepoxides.

According to a second and preferred variant of the invention, the curable composition used in the process according to the invention comprises an (meth)acrylated oligomer which is the reaction product of a carboxyl functionalized polybutadiene comprising x equivalents of —COOH groups with z equivalents of at least one polyepoxide and at least (z−x) equivalents of at least one α,β-unsaturated carboxylic acid. By z equivalents of at least one polyepoxide is meant to designate an amount of polyepoxide giving z equivalents of epoxy groups per x equivalents of —COOH groups. In this variant of the invention, z is preferably at least 1.5 x, more preferably at least 2 x. It is particularly preferred to use an amount of polyepoxide such that z is greater than 2x. z does usually not exceed 20 x, preferably not 15 x. When z is greater than 2x, the excess of polyepoxide reacts with the α,β-unsaturated carboxylic acid so that an (meth)acrylated polyepoxide derivative is formed in situ.

By polyepoxide is meant to designate any compound comprising at least two epoxide functions. The polyepoxides are generally chosen from glycidyl ethers of aromatic or aliphatic polyols or from cycloaliphatic polyepoxides. Preferred are diglycidylethers of aromatic or aliphatic diols or cycloaliphatic diepoxides, such as diglycidyl ether of bisphenol-A, diglycidyl ether of bisphenol-F, diglycidylether of poly(ethylene oxide-co-propylene oxide) (commercialized under the name of DER 736), diglycidylether of polypropylene oxide (commercialized under the name of DER 732), diglycidylether of hexanediol (commercialized under the name of NPEK-051), diglycidylether of butanediol (commercialized under the name of Araldite DY 026 SP), celloxide 2081. Particularly preferred are diglycidyl ether of bisphenol-A, diglycidylether of poly(ethylene oxide-co-propylene oxide), diglycidylether of polypropylene oxide, diglycidylether of butanediol.

The α,β unsaturated carboxylic acid is preferably chosen from acrylic and methacrylic acid, most preferably acrylic acid. The amount of α,β unsaturated carboxylic acid used in the second variant of the invention is preferably (z−x) equivalents wherein z is the amount of polyepoxide equivalents and x is the amount of —COOH equivalents of the carboxyl functionalized polybutadiene.

In this second variant of the invention, it is preferred to prepare the (meth)acrylated oligomer by adding the α,β unsaturated carboxylic acid to the carboxyl functionalized polybutadiene before or at the latest at the same time as the polyepoxide.

The curable composition used in the process according to the invention comprises generally at least 8%, preferably at least 10% and more preferably at least 11%, by weight of (meth)acrylated oligomer. The amount of (meth)acrylated oligomer preferably does not exceed 50% by weight, more preferably 40% by weight of the curable composition.

The composition comprising the (meth)acrylated oligomer used in the process according to the invention is preferably obtained by the reaction of the carboxyl functionalised polybutadiene and the mono- or polyepoxide in the presence of at least one non reactive diluent. By non reactive diluent is understood a product wherein the polybutadiene, the mono- or polyepoxide and the α,β unsaturated carboxylic acid are soluble or miscible and that does not react with those reactants during their reaction. The non reactive diluent is preferably a copolymerizable ethylenically unsaturated monomer, more preferably a mono- or polyfunctional (meth)acrylate monomer. By copolymerizable ethylenically unsaturated monomer is meant to designate monomers that are copolymerisable with the (meth)acrylated oligomer, generally under photo-polymerisation conditions, especially by irradiation in the presence of photoinitiator. Preferred copolymerizable ethylenically unsaturated monomers are monofuntional ones, such as octyl-decyl acrylate, lauryl acrylate, phenoxyethyl acrylate, isobornyl acrylate, phenylglycidyl ether acrylate, cyclic trimethylolpropane formal acrylate, n-butyl acryloyloxy ethyl carbamate, tetrahydrofurfuryl acrylate, the reaction products of acrylic acid with the glycidyl ester of aliphatic carboxylic acids such as neodecanoic acid and their mixtures. Most preferred non reactive diluents are phenoxyethyl acrylate, isobornyl acrylate, n-butyl acryloyloxy ethyl carbamate tetrahydrofurfuryl acrylate, the reaction products of acrylic acid with the glycidyl ester of aliphatic carboxylic acids such as neodecanoic acid and their mixtures. The amount of non-reactive diluent used is generally from 0 to 70%, preferably from 5 to 60% and more preferably from 15 to 50%, by weight relative to the total weight of carboxyl functionalized polybutadiene, mono- or polyepoxide, α,β-unsaturated carboxylic acid and non-reactive diluent used. Hence, the composition used in the invention preferably comprise at least one non reactive diluent, more specifically the non reactive diluent used during its preparation from the carboxylated polybutadiene with the acrylated epoxide or the polyepoxide and the α,β-unsaturated carboxylic acid. The amount of non-reactive diluent in the curable composition is generally from 0 to 65%, preferably from 5 to 50% and more preferably from 8 to 20%, by weight.

The composition comprising the (meth)acrylated oligomer used in the process according to the invention is preferably obtained by the reaction of the carboxyl functionalised polybutadiene and the mono- or polyepoxide in the presence of at least one catalyst. Catalysts that may be used to promote the acid-epoxy reaction include inorganic alkaline salts, organometallic salts, quaternary ammonium salts, basic organic compounds, phosphines or mixtures thereof. Exemplary catalysts include without limitation sodium carbonate, lithium octanoate, chromium octanoate, triethanolamine, N,N-dimethylaniline, triethylbenzyl ammonium chloride, benzyltrimethyl ammonium chloride, triphenyl stibene, triphenyl phosphine. The amount of catalyst used is preferably from 0 to 3% by weight relative to the total weight of carboxyl functionalized polybutadiene, mono- or polyepoxide, α,β unsaturated carboxylic acid and non-reactive diluent used.

The composition used in the process according to the invention usually also contains at least one inhibitor. Inhibitors include without limitation hydroquinone, toluhydroquinone, monomethyl ether hydroquinone, tert-butyl hydroquinone, di-tert-butyl hydroquinone, phenothiazine. The amount of inhibitor used is preferably from 0 to 0.5% by weight relative to the total weight of carboxyl functionalized polybutadiene, mono- or polyepoxide, $\alpha,\beta$ unsaturated carboxylic acid and non-reactive diluent used.

Besides the non-reactive diluent used during the synthesis of the (meth)acrylated oligomer, the curable composition may also comprise an additional amount of diluent which is added to the (meth)acrylated oligomer after its synthesis. This diluent is preferably a copolymerizable ethylenically unsaturated monomer, more preferably a mono- or polyfunctional (meth)acrylate monomer. By copolymerizable ethylenically unsaturated monomer is meant to designate monomers that are copolymerisable with the (meth)acrylated oligomer, generally under photo-polymerisation conditions, especially by irradiation in the presence of photoinitiator. Preferred are monofunctional copolymerizable ethylenically unsaturated monomers, including the non-reactive diluents described here above. The amount of additional diluent present in the curable composition is generally from 0 to 60%, preferably from 5 to 50%, more preferably from 10 to 40%, by weight.

The curable composition used in the invention preferably comprises at least one (meth)acrylated polyepoxide, especially the one obtained during the reaction of the carboxylated polybutadiene with an excess of the mixture of the polyepoxide and the $\alpha,\beta$-unsaturated carboxylic acid. The excess of polyepoxide and $\alpha,\beta$-unsaturated carboxylic acid used during the synthesis of the (meth)acrylated oligomer are preferably such that the amount of (meth)acrylated polyepoxide in the composition is from 0.01 to 60%, preferably from 5 to 50% and more preferably from 7 to 40%, by weight of the composition.

The curable composition used in the process according to the invention generally comprises at least one photochemical initiator and/or chemical initiator, capable of initiating the polymerization of the (meth)acrylated oligomer and optionally the other acrylated compounds present therein. Photochemical initiators (also called photoinitiators) are compounds that can generate radicals by absorption of light, typically UV light. Typical photochemical initiators are described in "The chemistry of free radical polymerization", edited by Graeme Moad and David H. Solomon; Pergamon (1995), pages 84 to 89. Chemical initiators are typically azo-compounds or peroxides that are decomposed to radicals through the application of heat, light or a redox process. The mechanisms are described in "The chemistry of free radical polymerization", edited by Graeme Moad and David H. Solomon; Pergamon (1995), pages 53-95.

Curable compositions comprising at least one photoinitiator are preferred. Preferably, the amount of photoinitiator or chemical initiator in the composition is comprised between 0.01 and 5 wt %.

The curable composition may in addition also contain one or more adhesion promotors. The amount of adhesion promoters is generally from 0 to 20% by weight. Preferably an amount of 3 to 15% by weight of adhesion promoter is used.

The curable composition used in the invention may also comprise pigments, colorants and/or other additives such as multifunctional acrylated compounds, conductive pigments, dispersing agents, flow modification agents, slip agents, fire retardant agents, UV-protection agents, . . . . The amount of additives preferably does not exceed 10% by weight.

After the coating of the metal sheet with the curable composition, the latter is cured. Curing, i.e. polymerisation can be achieved by any suitable means well known to those skilled in the art, such as thermal curing or irradiation. The irradiation curing can be done by using UV light or ionising radiation such as gamma rays, X-rays or electron beam. In the process according to the invention, electron beam and especially UV-radiation are preferred.

After the curing of the curable composition, the coated metal sheet can be recoiled immediately or one or more additional coatings can be applied thereto before recoiling. In the process according to the invention, steps (2) and (3) can be repeated in order to coat the metal sheet with two or more curable compositions as defined here above. In this case, the curable compositions can be the same or different.

The process according to the invention permits to obtain coated metal coils with a reduced amount or even without the use of solvents, hence a reduced fire hazard and reduction of energy use, need for elimination or recycling of solvents and space saving on the line (no drying ovens necessary).

The process according to the invention permits to obtain coated metal sheets having an improved chemical and solvent resistance, scratch resistance and surface hardness together with an improved flexibility, adhesion and resistance to cracking on bending and rapid deformation and improved corrosion resistance which make them suitable for being used for postforming. The coatings have an improved balance of surface hardness, flexibility and surface hardness.

The process according to the invention when used to apply a curable primer on the galvanization or electrozinc line after deposition of the zinc layer onto the metal surface could permit to avoid some or all of the following steps of the current process: oiling of the strip before recoiling on the galvanization or electrozinc line, chemical cleaning and chemical pretreatment on the coating line. Chemical pretreatment is often a chromatation using Cr VI, the use of the process according to the invention would permit to solve this environmental issue. The process according to the invention permits to obtain coated metal coils having a good corrosion resistance even without the use of chemical pretreatments of the metal, for example by chromatation.

The invention is further illustrated by the following examples:

EXAMPLE 1

145.2 g hydroxyl-terminated polybutadiene (Poly BD R-20 LM™ supplied by Atofina), 38.5 g phthalic anhydride and 1.1 g of chromium octoate catalyst (AMC-2) are placed into a reaction flask equipped with an agitator, liquid addition funnel and thermometer. This mixture is heated at 115° C. and maintained at this temperature for 2 hours.

A mixture of 301.2 g phenoxyethyl acrylate (Ebecryl™ 114 commercialized by Surface Specialties UCB), 131.2 g acrylic acid, 0.8 g hydroquinone and 0.4 g AMC-2 is then added to the flask and the flask content is stirred at 103° C. for one hour. The addition funnel is fed with 385.9 g of diglycidyl ether of bisphenol-A (BADGE) which is added dropwise to the reaction flask so that the temperature in the reaction flask does not exceed 120° C. The reaction mixture is stirred at 110° C. until the acid value is lower than 2.5 mg KOH/g and the epoxy value is lower than 0.50%.

The properties of the obtained composition are presented in Table 1.

EXAMPLES 2-4

Resins of examples 2-4 are obtained according to the same method as described in example 1, except that Ebecryl 114™ is replaced by other diluents: 301.2 g n-butyl acryloyloxy ethyl carbamate (Ebecry™ 1039 commercialized by Surface Specialties UCB) in example 2, 301.2 g cyclic trimethylolpropane formal acrylate (TMPFA) in example 3 and 301.2 g isobornyl acrylate (IBOA) in example 4. The properties of the obtained compositions are presented in Table 1.

EXAMPLES 5-7

Resins of examples 5-7 are obtained according to the same method as described in example 1 except that Poly BD R-20 LM™ is replaced by other hydroxyl-terminated polybutadienes and isobornyl acrylate replaces Ebecryl 114™: 200.0 g Nisso PB G-1000™ (supplied by Nippon Soda) and 324.8 g isobornyl acrylate in example 5, 286.0 g Poly BD R-45 HT™ (supplied by Atofina) and 361.7 g isobornyl acrylate in example 6, 324.1 g Nisso PB G-3000™ (supplied by Nippon Soda) and 378.0 g isobornyl acrylate in example 7.

The properties of the obtained compositions are presented in Table 1.

EXAMPLES 8-12

Resins of examples 8-12 are obtained according to the same method as described in example 1, except that diglycidyl ether of bisphenol-A is replaced by other diepoxides and isobornyl acrylate replaces Ebecryl 114™: 395.2 g DER736™ and 305.3 g isobornyl acrylate in example 8, 239.2 g NPEK 051™ and 238.5 g isobornyl acrylate in example 9, 210.1 g Araldite DY026SP™ and 226.0 g isobornyl acrylate in example 10, 665.6 g DER732™ and 421.2 g isobornyl acrylate in example 11, 416.0 g Celloxide 2081 and 314.2 g isobornyl acrylate in example 12.

The properties of the obtained compositions are presented in Table 1.

EXAMPLES 13-16

Resins of example 13-16 are obtained according to the same method as described in example 1, except that phthalic anhydride is replaced by other cyclic anhydrides and isobornyl acrylate replaces Ebecryl 114™: 26.0 g succinic anhydride and 296.0 g isobornyl acrylate in example 13, 69.2 g dodecenylsuccinic anhydride and 314.5 g isobornyl acrylate in example 14, 40.0 g hexahydrophthalic anhydride and 302.0 g isobornyl acrylate in example 15, 29.6 g glutaric anhydride and 297.5 g isobornyl acrylate in example 16.

The properties of the obtained compositions are presented in Table 1.

EXAMPLE 17-19

Resins of examples 17-19 are obtained according to the same method as described in example 1, except that isobornyl acrylate replaces Ebecryl 114™ and its amount as well as the amounts of diglycidyl ether of bisphenol-A and acrylic acid vary: 241.2 g diglycidyl ether of bisphenol-A, 74.9 g acrylic acid and 358.6 g isobornyl acrylate in example 17, 530.5 g diglycidyl ether of bisphenol-A, 187.4 g acrylic acid and 116.2 g isobornyl acrylate in example 18, 241.2 g diglycidyl ether of bisphenol-A, 74.9 g acrylic acid and 215.2 g isobornyl acrylate in example 19.

The properties of the obtained compositions are presented in Table 1.

EXAMPLE 20

Resin of example 20 is obtained according to the same method as described in example 1, but the following reagents and amounts are modified: Poly BD R-20 LM™ is replaced by 286.0 g Poly BD R-45 HT™, Ebecryl 114™ by 447.7 g isobornyl acrylate and 241.2 g diglycidyl ether of bisphenol-A and 74.9 g acrylic acid are used.

The properties of the obtained composition are presented in Table 1.

EXAMPLE 21

Resin of example 21 is obtained according to the same method as described in example 1, but Ebecryl 114™ is replaced by 301.2 g of isobornyl acrylate and AMC-2 by 5.0 g triethanolamine that is added in once together with isobornyl acrylate, acrylic acid and hydroquinone.

The properties of the obtained composition are presented in Table 1.

EXAMPLE 22

253.45 g carboxyl-terminated polybutadiene (Nisso PB C-1000 supplied by Nippon Soda), 331.2 g isobornyl acrylate, 131.2 g acrylic acid, 0.8 g hydroquinone and 1.5 g AMC-2 are placed into a reaction flask equipped with an agitator, liquid addition funnel and thermometer and are heated at 103° C. The addition funnel is fed with 385.9 g of diglycidyl ether of bisphenol-A which is added dropwise to the reaction flask so that the temperature in the reaction flask does not exceed 120° C. The reaction mixture is stirred at 110° C. until the acid value is lower than 2.5 mg KOH/g and the epoxy value is lower than 0.50%.

The properties of the obtained composition are presented in Table 1.

EXAMPLE 23

Resin of example 23 is obtained according to the same method as described in example 1, but the following reagents and amounts are modified: Ebecryl 114™ by 126.3 g isobornyl acrylate and 91.7 g diglycidyl ether of bisphenol-A and 16.9 g acrylic acid are used.

The properties of the obtained composition are presented in Table 1.

EXAMPLE 24

145.2 g hydroxyl-terminated polybutadiene (Poly BD R-20 LM™ supplied by Atofina), 38.5 g phthalic anhydride and 0.4 g AMC-2 are placed into a reaction flask equipped with an agitator, liquid addition funnel and thermometer. This mixture is heated at 115° C. and maintained at this temperature for 2 hours.

A mixture of 95.1 g isobornyl acrylate, 0.3 g hydroquinone monomethylether, 0.5 g triphenylantimony is then added to the flask and the flask content is stirred at 103° C. for one hour.

The addition funnel is fed with 37.2 g of glycidylmethacrylate which is added dropwise to the reaction flask so that the temperature in the reaction flask does not exceed 120° C. The reaction mixture is stirred at 105° C. until the acid value is lower than 2.5 mg KOH/g and the epoxy value is lower than 0.50%.

The properties of the obtained composition are presented in Table 1.

W/cm non focalized medium pressure mercury vapour lamp to obtain tack free films.

The samples are tested for solvent resistance (ECCA T11), cross-hatch adhesion (ISO 2409), adhesion and resistance to cracking on bending (T-bend test EN 13523-7), adhesion and resistance to cracking on rapid deformation (reverse impact, ISO/DIS 6272-ASTM D 2794) and adhesion on slow drawn deformation (ISO 1520).

TABLE 1

| Ex. | polybutadiene Nature | Anhydride Nature | Eq.[1] | Epoxide Nature | Eq.[1] | Acrylic acid Eq.[1] | Diluent Nature | Wt % | Visc. (mPa · s @ 60° C.) |
|---|---|---|---|---|---|---|---|---|---|
| 1 | Poly BD R-20 LM | phthalic | 1.0 | BADGE | 8.0 | 7.0 | EB114 | 30% | 1400 |
| 2 | Poly BD R-20 LM | phthalic | 1.0 | BADGE | 8.0 | 7.0 | EB1039 | 30% | 1609 |
| 3 | Poly BD R-20 LM | phthalic | 1.0 | BADGE | 8.0 | 7.0 | TMPFA | 30% | 754 |
| 4 | Poly BD R-20 LM | phthalic | 1.0 | BADGE | 8.0 | 7.0 | IBOA | 30% | 587 |
| 5 | Nisso PB G-1000 | phthalic | 1.0 | BADGE | 8.0 | 7.0 | IBOA | 30% | 963 |
| 6 | Poly BD R-45 HT | phthalic | 1.0 | BADGE | 8.0 | 7.0 | IBOA, | 30% | 1550 |
| 7 | Nisso PB G-3000 | phthalic | 1.0 | BADGE | 8.0 | 7.0 | IBOA | 30% | 2321 |
| 8 | Poly BD R-20 LM | phthalic | 1.0 | DER 736 | 8.0 | 7.0 | IBOA | 30% | 96 |
| 9 | Poly BD R-20 LM | phthalic | 1.0 | NPEK 051 | 8.0 | 7.0 | IBOA | 30% | 100 |
| 10 | Poly BD R-20 LM | phthalic | 1.0 | Araldite DY026SP | 8.0 | 7.0 | IBOA | 30% | 137 |
| 11 | Poly BD R-20 LM | phthalic | 1.0 | DER 732 | 8.0 | 7.0 | IBOA | 30% | 58 |
| 12 | Poly BD R-20 LM | phthalic | 1.0 | Celloxide 2081 | 8.0 | 7.0 | IBOA | 30% | NA |
| 13 | Poly BD R-20 LM | succinic | 1.0 | BADGE | 8.0 | 7.0 | IBOA | 30% | 529 |
| 14 | Poly BD R-20 LM | dodecenylsuccinic | 1.0 | BADGE | 8.0 | 7.0 | IBOA | 30% | 455 |
| 15 | Poly BD R-20 LM | hexahydrophthalic | 1.0 | BADGE | 8.0 | 7.0 | IBOA | 30% | 523 |
| 16 | Poly BD R-20 LM | glutaric | 1.0 | BADGE | 8.0 | 7.0 | IBOA | 30% | 470 |
| 17 | Poly BD R-20 LM | phthalic | 1.0 | BADGE | 5.0 | 4.0 | IBOA | 50% | 142 |
| 18 | Poly BD R-20 LM | phthalic | 1.0 | BADGE | 11.0 | 10.0 | IBOA | 9% | NA |
| 19 | Poly BD R-20 LM | phthalic | 1.0 | BADGE | 5.0 | 4.0 | IBOA | 30% | 1328 |
| 20 | Poly BD R-45 HT | phthalic | 1.0 | BADGE | 5.0 | 4.0 | IBOA | 30% | 2551 |
| 21 | Poly BD R-20 LM (Ato) | phthalic | 1.0 | BADGE | 8.0 | 7.0 | IBOA | 30% | 1164 |
| 22 | Nisso PB C-1000[2] | none | 0.0 | BADGE | 8.0 | 7.0 | IBOA | 30% | 828 |
| 23 | Poly BD R-20 LM (Ato) | phthalic | 1.0 | BADGE | 1.9 | 0.9 | IBOA | 30% | 8712 |
| 24 | Poly BD R-20 LM (Ato) | phthalic | 1.0 | GMA | 1.0 | 0.0 | IBOA | 30% | 735 |

[1]Equivalents are defined with respect to 1 equivalent of OH groups of the used polybutadiene
[2]Equivalents are defined with respect to 1 equivalent of COOH groups of the Nisso PB C-1000
NA: non available

EXAMPLES 25-45

UV curable formulations are prepared by mixing the resins obtained in examples 1 to 3, 4 to 11, 13, 14, 16, 17 and 19 to 24 with the following ingredients:

67 wt % resin 11 wt % adhesion promoter (Ebecryl 375™ from Surface Specialties UCB)

20 wt % of diluent (mixture of copolymerizable ethylenically unsaturated monomers)

2 wt % Irgacure 651™ from Ciba Geigy

The substrate is HDG (hot dip galvanized steel) cleaned with acetone, ethanol demineralised water, dipped in an aqueous solution of $H_2SO_4$ (10 wt %), rinsed with demineralised water and dried. The UV formulations are applied by means of a 10 μm bar coater and exposed to UV radiations from an 120

The results obtained are presented in Table 2.

COMPARATIVE EXAMPLE 46R

An UV formulation to be compared with example 30 is prepared by blending the following components such as described in US 2003/00018150:

20 wt % polybutadiene resin Poly BD R-20 LM 27 wt % BADGE diacrylate (Ebecryl 3700™ from Surface Specialties UCB)

11 wt % adhesion promoter (Ebecryl 375™ from Surface Specialties UCB)

40 wt % of diluent (copolymerizable ethylenically unsaturated monomers)

2 wt % Irgacure 651™ from Ciba Geigy

After a few hours, the formulation separates in two phases.

COMPARATIVE EXAMPLES 47R

An UV formulation to be compared with example 30 is prepared according to the following composition and evaluated as described in examples 25-45.

67 wt % polybutadiene diacrylate BAC-15 supplied by Kowa Europe GmbH, made by Osaka Organic Chemicals, responding to the general formula:

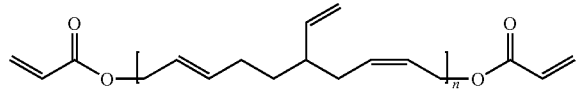

11 wt % adhesion promoter (Ebecryl 375™ from Surface Specialties UCB)
20 wt % of diluent (copolymerizable ethylenically unsaturated monomers)
2 wt % Irgacure 651™ from Ciba Geigy The results obtained are presented in Table 2.

EXAMPLES 48-49

An UV formulation having the following composition is prepared:
43 wt % resin as prepared in example 6
7 wt % Ebecryl 375™ from Surface Specialties UCB
47 wt % of copolymerizable ethylenically unsaturated monomers
2 wt % Irgacure 651™ from Ciba Geigy It is applied on a HDG substrate (dipped in an alkaline solution (Parco 305C from Chemetall), rinsed with water, demineralised water and dried) in example 48 and on electrozinc steel (cleaned with acetone, ethanol, demineralised water, dipped in an aqueous solution of $H_2SO_4$ (10 wt %), rinsed with demineralised water and dried) in example 49 and tested according to the methods described in examples 25-45. The results obtained are presented in Table 2.

EXAMPLES 50-51

An UV formulation having the following composition is prepared:
90 wt % resin as prepared in example 17
5 wt % Ebecryl 171™ from Surface Specialties UCB (promoter adhesion)
3 wt % Irgacure 184™ from Ciba Geigy
2 wt % Lucerin TPO-L™ from BASF (initiator)

It is applied on a HDG substrate (dipped in an alkaline solution (Parco 305C from Chemetall), rinsed with water, demineralised water and dried) in example 50 and on chromated electrozinc steel (cleaned with acetone, ethanol, demineralised water and dried) in example 51 and tested according to the methods described in examples 25-45.

The results obtained are presented in Table 2.

EXAMPLES 52-53

The resins of examples 52 and 53 are obtained according to example 6 except that isobornyl acrylate is replaced by 301.2 g of tetrahydrofurfuryl acrylate in example 52 and by 301.2 g of Ebecryl™ 113 (commercialized by Surface Specialties UCB) in example 53. When used in formulations as described in examples 25-45, similar properties as those of example 30 are obtained.

TABLE 2

| Ex. | Resin | Solvent resistance (MEK DR) | Cross hatch adhesion | Adh. On slow drawn deform (mm) | T-bend adhesion | T-bend cracking | Reverse impact adhesion | Reverse impact cracking |
|---|---|---|---|---|---|---|---|---|
| 25 | Ex. 1 | 15 | 2 | 2 | >1 T | 0 T | <1.96 J | 18 J |
| 26 | Ex. 2 | 20 | 0 | 2 | >1 T | 0 T | <1.96 J | 18 J |
| 27 | Ex. 3 | 20 | 2 | 2 | >1 T | 0.5 T | <1.96 J | 18 J |
| 28 | Ex. 4 | 15 | 0 | 6 | >1 T | 0.5 T | 1.96 J | 18 J |
| 29 | Ex. 5 | 35 | 0 | 4 | >1 T | 1 T | 1.96 J | 18 J |
| 30 | Ex. 6 | 15 | 0 | > or =6 | >1 T | 0 T | 1.96 J | 18 J |
| 31 | Ex. 7 | 30 | 0 | 4 | >1 T | 0.5 T | <1.96 J | 18 J |
| 32 | Ex. 8 | 10 | 0 | 4 | >1 T | 0 T | <1.96 J | 18 J |
| 33 | Ex. 9 | 8 | 2 | 4 | >1 T | 1 T | <1.96 J | 18 J |
| 34 | Ex. 10 | 18 | 0 | 2 | >1 T | 0 T | <1.96 J | 18 J |
| 35 | Ex. 11 | 7 | 0 | 4 | >1 T | 0 T | 1.96 J | 18 J |
| 36 | Ex. 13 | 20 | 0 | <2 | >1 T | >1 T | <1.96 J | 18 J |
| 37 | Ex. 14 | 15 | 0 | 4 | >1 T | 0.5 T | <1.96 J | 18 J |
| 38 | Ex. 16 | 30 | 1 | 2 | >1 T | >1 T | <1.96 J | 18 J |
| 39 | Ex. 17 | 22 | 0 | 6 | >1 T | >1 T | <1.96 J | 18 J |
| 40 | Ex. 19 | 30 | 0 | 4 | >1 T | 0 T | 1.96 J | 18 J |
| 41 | Ex. 20 | 30 | 0 | 4 | >1 T | 0 T | 1.96 J | 18 J |
| 42 | Ex. 21 | 25 | 0 | 4 | >1 T | 0 T | <1.96 J | 18 J |
| 43 | Ex. 22 | 35 | 0 | 4 | >1 T | 0.5 T | 1.96 J | 18 J |
| 44 | Ex. 23 | 50 | 0 | 4 | >1 T | 0 T | <1.96 J | 18 J |
| 45 | Ex. 24 | 40 | 2 | 4 | >1 T | 0 T | <1.96 J | 18 J |
| 46R | Poly BD R-20 LM | | | Formulation phase separates, not tested | | | | |
| 47R | BAC-15 | 10 | 0 | <2 | >1 T | >1 T | <1.96 J | 18 J |
| 48 | Ex. 6 | 13 | 0 | > or =8 | 1 T | 0 T | 18 J | 18 J |
| 49 | Ex. 6 | 13 | 0 | > or =8 | 0.5 T | 0 T | 18 J | 18 J |
| 50 | Ex. 17 | 90 | 0 | 8 | 1 T | 0 T | 18 J | 18 J |
| 51 | Ex. 17 | 90 | 0 | 6 | >1 T | >1 T | 18 J | 14.75 J |

What is claimed is:

1. Process for preparing a coated metal sheet coil comprising the following steps:
(1) decoiling of the coiled metal sheet;
(2) coating the metal sheet with a curable composition comprising an (meth)acrylated oligomer which is the reaction product of a carboxyl functionalized polybutadiene comprising x equivalents of —COOH groups with y equivalents of one or more (meth)acrylated monoepoxides; with y≧x;
(3) curing the composition; and
(4) recoiling the coated metal sheet.

2. Process according to claim 1, wherein the carboxyl functionalized polybutadiene is the reaction product of a hydroxyl-terminated polybutadiene with a cyclic anhydride corresponding to the general formula (I):

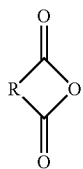
(I)

wherein R represents arylene, cycloalkylene, alkylene or alkenylene group, optionally substituted by an alkyl group, an alkenyl group, a —COOH group and/or another anhydride group.

3. Process according to claim 2, wherein the cyclic anhydride corresponding to formula (I) wherein R represents arylene or alkylene group, optionally substituted by an alkenyl chain comprising from 5 to 20 carbon atoms.

4. Process according to claim 3, wherein the cyclic anhydride corresponding to formula (I) is phthalic anhydride or dodecenylsuccinic anhydride.

5. Process according to claim 1, wherein the carboxyl functionalized polybutadiene is the reaction product of a hydroxyl-terminated polybutadiene comprising p —OH equivalents with from 0.8 p to 1.0 p equivalents of a cyclic anhydride corresponding to the general formula (I):

wherein R represents arylene, cycloalkylene, alkylene or alkenylene group, optionally substituted by an alkyl group, an alkenyl group, a —COOH group and/or another anhydride group.

6. Process according to claim 1, wherein the (meth)acrylated mono-epoxide is chosen from glycidylacrylate and glycidylmethacrylate.

7. Process according to claim 1, wherein the (meth)acrylated oligomer is obtained by the reaction of the carboxyl functionalised polybutadiene and the mono-epoxide in the presence of at least one non reactive diluent chosen from mono- or polyfunctional (meth)acrylate monomers.

8. Process according to claim 7, wherein the non reactive diluent is chosen from phenoxyethyl acrylate, isobornyl acrylate, n-butyl acryloyloxy ethyl carbamate and their mixtures.

9. Process according to claim 1, wherein the curable composition comprises:
from 8% to 50% by weight of (meth)acrylated oligomer,
from 0 to 65% by weight of non-reactive diluent,
from 0 to 60% by weight of additional diluent chosen from copolymerizable ethylenically unsaturated monomers,
from 0.01 to 5% by weight of photoinitiator or chemical initiator, and
from 0 to 20% by weight of adhesion promoter.

10. Process according to claim 1, wherein the curing is done by electron beam or UV-radiation.

* * * * *